United States Patent
Amici-Kroutilova et al.

(10) Patent No.: US 9,840,579 B2
(45) Date of Patent: Dec. 12, 2017

(54) THIXOTROPIC POLYOL COMPOSITIONS CONTAINING DISPERSED URETHANE-MODIFIED POLYISOCYANURATES

(71) Applicant: DOW GLOBAL TECHNOLOGIES LLC, Midland, MI (US)

(72) Inventors: Irena Amici-Kroutilova, Waedenswil (CH); Paul Cookson, Samstagern (CH); Daniel Hoenhener, Dubendorf (CH); Francois Casati, Pfaffikon (CH)

(73) Assignee: Dow Global Technologies LLC, Midland, MI (US)

( * ) Notice: Subject to any disclaimer, the term of this patent is extended or adjusted under 35 U.S.C. 154(b) by 50 days.

(21) Appl. No.: 14/916,989

(22) PCT Filed: Sep. 11, 2014

(86) PCT No.: PCT/US2014/055267
§ 371 (c)(1),
(2) Date: Mar. 4, 2016

(87) PCT Pub. No.: WO2015/038830
PCT Pub. Date: Mar. 19, 2015

(65) Prior Publication Data
US 2016/0208041 A1    Jul. 21, 2016

Related U.S. Application Data

(60) Provisional application No. 61/877,290, filed on Sep. 13, 2013, provisional application No. 61/877,287, filed on Sep. 13, 2013.

(51) Int. Cl.
| | |
|---|---|
| C08G 18/08 | (2006.01) |
| C08G 18/09 | (2006.01) |
| C08G 18/10 | (2006.01) |
| C08G 18/12 | (2006.01) |
| C08G 18/18 | (2006.01) |
| C08G 18/22 | (2006.01) |
| C08G 18/28 | (2006.01) |
| C08G 18/32 | (2006.01) |
| C08G 18/48 | (2006.01) |
| C08G 18/66 | (2006.01) |
| C08G 18/76 | (2006.01) |
| C09D 5/04 | (2006.01) |

(52) U.S. Cl.
CPC ..... *C08G 18/7621* (2013.01); *C08G 18/0876* (2013.01); *C08G 18/092* (2013.01); *C08G 18/10* (2013.01); *C08G 18/12* (2013.01); *C08G 18/1875* (2013.01); *C08G 18/222* (2013.01); *C08G 18/225* (2013.01); *C08G 18/283* (2013.01); *C08G 18/3281* (2013.01); *C08G 18/4833* (2013.01); *C08G 18/4845* (2013.01); *C08G 18/6688* (2013.01); *C09D 5/04* (2013.01)

(58) Field of Classification Search
CPC ............ C08G 18/7621; C08G 18/0876; C08G 18/092; C08G 18/1875; C08G 18/222; C08G 18/225; C08G 18/283; C08G 18/3281; C08G 18/10; C08G 18/12; C08G 18/4833; C08G 18/4845; C08G 18/6688; C09D 5/04
See application file for complete search history.

(56) References Cited

U.S. PATENT DOCUMENTS

| | | | |
|---|---|---|---|
| 3,893,956 A | 7/1975 | Brandt | |
| 4,145,544 A * | 3/1979 | Kuehn | C07D 251/34 544/193 |
| 4,202,956 A | 5/1980 | Taylor | |
| 4,326,043 A | 4/1982 | Narayan | |
| 4,452,923 A | 6/1984 | Carroll | |
| 4,522,986 A | 6/1985 | Short | |
| 5,714,565 A * | 2/1998 | Nodelman | C08G 18/1875 524/770 |
| 5,955,534 A | 9/1999 | Simroth | |
| 6,111,001 A | 8/2000 | Barancyk | |
| 6,420,466 B1 | 7/2002 | Haubennesterl | |
| 7,799,858 B2 | 9/2010 | Brinkhuis | |
| 8,153,711 B1 | 4/2012 | Yokoyama | |
| 8,207,268 B2 | 6/2012 | Brinkhuis | |
| 2002/0007003 A1 | 7/2002 | Merz | |
| 2004/0186261 A1 | 9/2004 | Rink | |
| 2011/0124795 A1 | 5/2011 | Van De Zande | |
| 2013/0303804 A1 | 11/2013 | Walther | |

FOREIGN PATENT DOCUMENTS

| | | |
|---|---|---|
| CA | 2813844 A | 4/2012 |
| EP | 192304 A | 8/1986 |
| EP | 776922 A | 6/1997 |
| WO | 2008/116610 A | 10/2008 |
| WO | 2010/080425 A | 7/2010 |
| WO | 2012/126179 A | 9/2012 |
| WO | 2013/101524 A | 7/2013 |
| WO | 2014/037558 A | 3/2014 |

* cited by examiner

*Primary Examiner* — Patrick Niland

(57) ABSTRACT

Thixotropic polyol dispersions are described. The dispersions contain a dispersed phase of polyurethane-isocyanurate particles. They can be made by reacting a low equivalent weight polyol with a polyisocyanate in the presence of an isocyanate trimerization catalyst while dispersed in a base polyol. These polyol dispersions are useful as the resin component of curable systems such as formulated coatings, sealants or adhesives.

23 Claims, No Drawings

THIXOTROPIC POLYOL COMPOSITIONS CONTAINING DISPERSED URETHANE-MODIFIED POLYISOCYANURATES

This invention relates to thixotropic polyol compositions that are useful, for example, in coating, sealant and adhesive applications.

A thixotropic material is one that exhibits a large reversible reduction in viscosity when placed under applied shear. Such a material may be a viscous liquid or even a pasty solid under low shear conditions, but when shear is applied, its viscosity drops dramatically. When the shearing conditions are discontinued, the viscosity of a thixotropic material recovers, often to close to its original level. This property is very valuable in certain types of products, among which sealants and adhesives are notable examples. Thixotropic behavior allows a product to be applied easily through application of shear, because the material will flow easily due to the resulting decrease in viscosity. Once applied, and the product is once again under static conditions, its viscosity rises again. The high viscosity after application prevents the applied material from sagging or running off the substrate until such time as it cures. Because these products often are formulated to cure slowly, or to cure only upon exposure to specific curing conditions (such as an elevated temperature, exposure to free radicals or UV radiation, exposure to moisture, etc.), the ability of the material to resist sagging and run-off prior to curing is very important. The thixotropic behavior is also beneficial after the material is applied, because it allows the applied product to be worked easily by troweling or other methods.

Products such as coatings, sealants and adhesives generally include one or more resinous materials that cure after application to form a high molecular weight polymer. These resinous materials themselves seldom are thixotropic by themselves, so thixotropic behavior is in most cases achieved by incorporating one or more additives into the product. Various types are known. They are generally believed to function by creating physical "crosslinks" that are easily overcome by applying mechanical energy. Thus, long chain linear polymers and so-called "hyperbranched" polymers have been used as thixotropic agents. They are believed to function at least partly through chain entanglement mechanism. Other thixotropic agents are believed to function primarily by forming hydrogen bonds to other components of the product. Therefore, certain materials that strongly hydrogen bond to themselves and/or other materials in the product have been used as thixotropic additives. Examples of this type of thixotropic additives include highly dispersed silica products (also known as hydrophilic silicic acid, amorphous silicic acid, etc.) and crystallized urea particles. Urea thixotropic agents are described, for example, in U.S. Pat. No. 3,893,956, U.S. Pat. No. 3,547,848, U.S. Pat. No. 4,311,622, U.S. Pat. No. 8,207,268, CA2345874, and WO 2012/076611. Many urea compounds are particularly effective at hydrogen bonding, which is believed to account for their utility as thixotropic agents.

The use of additives has several drawbacks. They can significantly change the physical characteristics of the product. Particulate additives can settle from the product. Unless the additive becomes chemically bonded into the cured product, it can exude from or become dissolved out of the cured material over time, which can lead to shrinkage, porosity, changes in physical properties and other problems. The urea thixotropic agents can be difficult and expensive to manufacture due to the high reactivity of amines with isocyanates, and the need in some instances to use special raw materials such as chiral amines. Ureas in some cases dissolve into other components of the product, causing them to lose their effectiveness.

In U.S. Pat. No. 4,522,986 there is described a thixotropic agent for urethane coating compositions. The thixotropic agent is prepared by capping a polyether polyol with a diisocyanate to form a prepolymer, and then capping the isocyanate groups of the prepolymer with mono-, di- or triethanolamine to form an uncrosslinked urea compound having a number average molecular weight of 1000-4000 and a weight average molecular weight of 3000-12,000. These thixotropic agents are waxy solids that appear to dissolve into the urethane coating composition.

Various references describe isocyanurate-containing compounds as thixotropic agents or sag control agents in solvent- or water-borne formulations. These include EP 192,304, EP 198,519, EP 2,444,443, CA 2,813,844, WO 2003/091350, GB 2,237,277 and BD 2,462,105. These isocyanurate compounds typically contain urea groups (by reaction with an amine) and/or are highly branched materials. In each case, they are separately-manufactured compounds that are plagued with problems such as the need to use expensive raw materials, complex manufacturing processes, poor yields to product, and inconsistencies in the product. These compounds tend to be expensive due to the way they are manufactured. Because they are formed as a separate product, they need to be incorporated into the formulation in which they are used. This often requires melting and/or other blending steps, which further adds to cost and difficulty in use.

Thixotropic polyols are described in JP 2007-186647A, DD 156480 and SU 1986-4124651.

U.S. Pat. No. 4,326,043 describes a process in which polyisocyanate compounds are trimerized in solution to form isocyanurate compounds. These isocyanurate compounds then can be dispersed into a polyol. The resulting dispersions are not made thixotropic by virtue of adding the isocyanurate compounds.

This invention is in one aspect a thixotropic dispersion of polyurethane-isocyanurate particles in a liquid base polyol.

The invention is also a method of making the thixotropic dispersion of the invention, comprising reacting a low equivalent weight polyol with one or more polyisocyanate compounds in the presence of an isocyanate trimerization catalyst and a base polyether polyol to form polyurethane-isocyanurate particles dispersed in the base polyol.

Surprisingly, the polyurethane-isocyanurate particles have been found to impart thixotropic behavior to the dispersion. The dispersion of the invention has the very significant advantages of being inexpensive to manufacture. In addition, the thixotropic agent (i.e., the polyurethane-isocyanurate) is formed directly in the polyol, avoiding the problems and costs associated with forming a separately manufactured thixotropic agent and later combining it into a resin component.

The invention is also a curable resin composition comprising the thixotropic dispersion of the invention and at least one curing agent that reacts with hydroxyl groups. Such a curable resin composition may be, for example, a formulated sealant or adhesive.

For purposes of this invention, a dispersion is thixotropic if it exhibits a reduction in viscosity under shear of at least 20%, preferably at least 50%, compared to its viscosity under minimal shear and, after removal of the shear forces, its viscosity at least doubles from its minimum value under shear. In some embodiments, the dispersion exhibits a viscosity reduction of at least 75%, at least 90% or at least 95% from its initial (minimal shear) viscosity when placed under shear. In some embodiments, the viscosity of the dispersion increases removal of shear forces to at least 4 times or at least 8 times the minimum value obtained under shear. The initial viscosity of the dispersion at minimal shear may be, for example, at least 50 Pa·s or at least 100 Pa·s. Under minimal or no shear, the dispersion is typically a viscous fluid or even a paste. Viscosity measurements are made at 20±5° C. using a cone-and-plate rheometer in rotating mode, such as described in the following examples.

The thixotropic dispersion of the invention includes a liquid phase that includes at least one polyol or a mixture of polyols having a hydroxyl equivalent weight of at least 200. Polyurethane-isocyanurate particles are dispersed in the liquid phase. The polyurethane-isocyanurate particles may constitute, for example, 1 to 50, 1 to 35, 5 to 35, 5 to 25 or 10 to 25 percent of the weight of the dispersion.

The polyurethane-isocyanurate particles may have particle sizes, measured as described in the following examples, from 20 nm to 100 μm. In some embodiments, the polyurethane-ioscyanurate particles include at least some fine particles that have a particle size from 20 to 750 nm. In other embodiments, at least some of the polyurethane-isocyanurate particles are fine particles that have a size from 20 to 200 nm. The fine particles may constitute, for example, 5 to 100 weight percent, 5 to 50 weight percent, 5 to 25 weight percent or 5 to 10 weight percent of the polyurethane-ioscyanurate particles. It is preferred that no more than 5 weight percent of the particles are larger than 30 μm.

The particles in some embodiments are multimodal, falling into two or more distinct ranges of particle sizes, in which very few if any of the particles have particle sizes between the individual ranges. Thus, for example, some of the particles may fall within a distinct fraction having sizes from 20 nm to 1 μm or 20 nm to 0.5 μm, while other particles fall within one or more distinct, larger ranges.

Some or all of the polyurethane-isocyanurate particles may be grafted onto molecules of the liquid polyol or otherwise stabilized against agglomeration and/or settling by incorporation of various types of stabilizers.

The average hydroxyl equivalent weight of the base polyol preferably is at least 200, and may be as high as, for example, about 8000. A preferred hydroxyl equivalent weight is 360 to 3000, a more preferred equivalent weight is 500 to 2000 and an especially preferred equivalent weight is 500 to 1500. If the base polyol is a mixture of two or more separately made polyether polyols, each of the separately made polyols should have hydroxyl equivalent weights within these ranges.

The base polyol used as a starting material in this invention preferably has an average functionality of at least 2.0. It may be as high as 6.0, but more preferably is no more than 4.0. In the case of polyether polyols, functionalities for purposes of this invention are nominal functionalities. By "nominal" functionality, it is meant the average number of oxyalkylatable hydrogens per molecule of the initiator(s) used in making the polyether polyol.

The hydroxyl groups of the base polyol may be primary or secondary hydroxyls, or some mixture of both. In some embodiments, at least 75% of the hydroxyl groups of the base polyol are secondary hydroxyls. The base polyol may contain at least 85%, at least 92%, at least 95% or at least 98% of secondary hydroxyls. Conversely, the base polyol may contain no more than 25%, no more than 15%, no more than 8%, no more than 5% or no more than 2% primary hydroxyls. In other embodiments, the base polyol may contain at least 50%, at least 70% or at least 85% primary hydroxyl groups.

In some embodiments, the base polyol is a homopolymer or copolymer of propylene oxide, or a mixture of two or more thereof.

Useful copolymers of propylene oxide include random copolymers of propylene oxide and ethylene oxide. These are prepared by polymerizing a mixture of propylene oxide and ethylene oxide. The mixture preferably contains at least 80% by weight propylene oxide and no more than 20% ethylene oxide. A more preferred mixture contains 85 to 99.5% by weight propylene oxide and 0.5 to 15% by weight ethylene oxide.

Another useful copolymer of propylene oxide is a block copolymer containing one or more internal blocks of polymerized ethylene oxide and terminal blocks of polymerized propylene oxide. The ethylene oxide block or blocks can in the aggregate constitute 0.5 to 30% of the weight of the copolymer, although a preferred weight of the block or blocks is 0.5 to 20% of the total weight of the copolymer.

An especially preferred base polyol is a poly(propylene oxide) homopolymer or random copolymer of 80 to 99.5% by weight propylene oxide and 0.5 to 20% by weight ethylene oxide, having a hydroxyl equivalent weight of 700 to 2000, with a nominal functionality of 2 to 6, especially 2 to 4 or 2 to 3.

The dispersion can be prepared in by forming the polyurethane-isocyanurate particles in situ in a base polyol. Such an in situ process generally involves reacting a low equivalent weight polyol with one or more polyisocyanate compounds in the presence of an isocyanurate trimerization catalyst and a base polyol as described above, to form polyurethane-isocyanurate particles dispersed in the base polyol.

The low equivalent weight polyol preferably has a hydroxyl equivalent weight of up to 80, more preferably up to 75. It preferably has 2 to 6, more preferably 2 to 3, hydroxyl groups per molecule. It is preferred that it contains at least two primary hydroxyl groups (and optionally one or more secondary hydroxyl groups as well), and/or is an aminoalcohol. It preferably has low miscibility in the base polyol such that, at the relative amounts used the process, the low equivalent weight polyol disperses in the base polyol in the form of small droplets. Examples include ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, sucrose, diethanolamine, triethanolamine, triisopropanolamine, diisopropanolamine, and the like. Aminoalcohol compounds are preferred types. Triethanolamine is a highly preferred low equivalent weight polyol, and can be used by itself or as a mixture with one or more of the foregoing. Such a mixture may contain, for example, 75 to 99.9% by weight triethanolamine.

In terms of weight, about 1 to 50 parts of the low equivalent weight polyol per 100 parts by weight of base polyol typically are used, although this will vary with the amount of isocyanate groups present in the mixture formed in step (a) of the process and any additional polyisocyanate(s) added to such mixture. A preferred amount is at least 2 parts, more preferably at least 3 parts per 100 parts by weight of base polyol. A preferred upper amount is up to 20 parts, more preferably up to 15 parts by weight per 100 parts by weight of the base polyol. In some specific embodiments, 3 to 10 or 3 to 7 parts by weight are used per 100 parts by weight of base polyol.

The polyisocyanate compound preferably has an isocyanate equivalent weight of up to 300, more preferably up to 250, still more preferably up to 175 and in some embodiments 50 to 175. It should contain an average of at least 2, preferably 2 to 4, isocyanate groups per molecule. Examples of useful polyisocyanates for making the functionalized polyether include m-phenylene diisocyanate, toluene-2,4- diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Mixtures of any two or more of the foregoing can be used. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanates can be, for example, 0 to 50 parts by weight per 100 parts by weight of base polyol. A preferred amount is at least 2 parts, more preferably at least 3 parts, per 100 parts by weight of base polyol. A preferred upper amount is up to 20 parts, more preferably up to 15 parts by weight per 100 parts by weight of the base polyol. In some specific embodiments, 3 to 10 or 3 to 7 parts by weight of polyisocyanate are combined per 100 parts by weight of base polyol.

Useful isocyanate trimerization catalysts include strong bases such as alkali metal phenolates, alkali metal alkoxides, alkali metal carboxylates, quaternary ammonium salts, and the like. Among the alkali metal trimerization catalysts are sodium p-nonylphenolate, sodium p-octyl phenolate, sodium p-tert-butyl phenolate, sodium formate, sodium acetate, sodium propionate, sodium butyrate, sodium 2-ethylhexanoate, glycine N-[(2-hydroxy-5-nonylphenyl) methyl]-N-methyl-monosodium salt, potassium p-nonylphenolate, potassium p-octyl phenolate, potassium p-tert-butyl phenolate, potassium formate, potassium acetate, potassium propionate, potassium butyrate, potassium 2-ethylhexanoate, glycine N-[(2-hydroxy-5-nonylphenyl) methyl]-N-methyl-monopotassium salt, cesium p-nonylphenolate, cesium p-octyl phenolate, cesium p-tert-butyl phenolate, cesium formate, cesium acetate, cesium propionate, cesium butyrate, cesium 2-ethylhexanoate and glycine N-[(2-hydroxy-5-nonylphenyl)methyl]-N-methyl-monocesium salt. Among the useful ammonium salts are (2-hydroxypropyl)trimethylammonium 2-ethylhexanoate, (2-hydroxypropyl)trimethylammonium formate and the like. Aminophenolic compounds and N,N',N"-tris(3-dimethylaminopropyl)hexahydro-s-triazine are also useful trimerization catalysts. Imidazolium or imidazolinium salts can also be used as trimerization catalysts, such as 1-ethyl, 2-methyl-imidazolium acetate, 1,3-di-tert-butyl-imidazolinium acetate, 1,3-diadamantyl-imidazolium acetate, 1,3-diisopropyl-imidazolium acetate 1,3-di-tert-butyl-imidazolium acetate, 1-butyl-3-methylimidazolium acetate, and others disclosed in US 2011/0201709 A1. The alkali metal and ammonium compounds are generally preferred.

A urethane catalyst may be present in addition to the isocyanate trimerization catalyst, to promote the reaction of the low equivalent weight polyol with the polyisocyanate to form polyurethane groups. The urethane catalyst is a material which catalyzes the reaction of a hydroxyl group with an isocyanate group. Suitable catalysts include, for example, including tertiary amines, cyclic amidines, tertiary phosphines, various metal chelates, acid metal salts, strong bases, various metal alcoholates and phenolates and metal salts of organic acids. Catalysts of most importance are tertiary amine catalysts, cyclic amidines, and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N', N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of tin catalysts are stannic chloride, stannous chloride, stannous octoate, stannous oleate, dimethyltin dilaurate, dibutyltin dilaurate, other tin compounds of the formula $SnR_n(OR)_{4-n}$, wherein R is alkyl or aryl and n is 0-2, and the like. Tin catalysts are generally used in conjunction with one or more tertiary amine catalysts, if used at all. Tin catalysts tend to be strong gelling catalysts, so they are preferably used in small amounts, if used at all. It has been found that the use of tin catalysts can have a deleterious effect on the stability of the dispersion, especially when the dispersion is produced at a solids level of greater than 10%, such as 15 to 40%, and especially when the low equivalent weight polyol is triethanolamine. Therefore, it is preferred to omit tin catalysts, and to use instead one or more urethane catalysts that do not contain tin.

Isocyanate trimerization catalysts and urethane catalysts each are typically used in small amounts, for example, each catalyst being employed from about 0.0015 to about 5% by weight of base polyol.

A stabilizer can be present during the dispersion manufacturing process. Various types of stabilizers are useful, including various organosilicone surfactants, functionalized polymers of ethylene oxide such as described in U.S. Pat. No. 4,305,857, or previously-formed dispersions of polyurethane particles or seed particles such as described, for example, in WO 94/20558 and WO 2012/154820.

A prepolymer also can be present during the dispersion manufacturing process. Such a prepolymer contains isocyanate groups or isocyanate-reactive groups, and reacts with the low equivalent weight polyol and/or polyisocyanate during the dispersion-forming step and at least partly becomes incorporated into or onto the dispersed phase particles. The prepolymer may contain isocyanurate groups, and in some embodiments is the source of at least some if not all of the isocyanurate groups of the polyurethane-isocyanurate particles. Examples of prepolymers are isocyanate-functionalized and/or isocyanurate-containing polyethers such as described in U.S. Provisional Patent Application No. 61/877,287, filed 13 Sep. 2013, incorporated herein by reference. Among the isocyanate-functionalized polyether prepolymers are those represented by structure I:

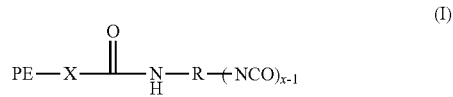

where R represents the residue, after removal of isocyanate groups, of a polyisocyanate having the structure R—(NCO)

$_x$; x represents the number of isocyanate groups on the starting polyisocyanate, typically being a number from 2 to 6; PE represents a polyether chain having a molecular weight of 200 to 8000, and X is —O— or —NH—. The PE group in structure 1 preferably is devoid of hydroxyl, primary amino and secondary amino groups.

A functionalized polyether shown in structure I can be prepared in a reaction of a monofunctional polyether with a polyisocyanate. The monofunctional polyether contains one isocyanate-reactive group, which may be, for example, an alcohol, a primary amine, a secondary amine, a thiol or an epoxide group. The monofunctional polyether preferably is a polyether monol or polyether monoamine. The monofunctional polyether preferably is a polymer of one or more cyclic ethers such as, or example, ethylene oxide, 1,2-propylene oxide, 1,3-propylene oxide, 1,2-butylene oxide, tetrahydrofuran and the like, onto a monofunctional initator compound. It is also possible to produce a starting polyether monol by polymerizing the cyclic ether onto a polyfunctional initiator to produce a polyol, and then capping all of the alcohol groups except one. Capping can be done by reaction with, for example, a monoisocyanate, a carboxylic acid or a carboxylic acid alkyl (preferably methyl) ester. Enough of the polyisocyanate is used to consume the isocyanate-reactive groups of the monofunctional polyether. An excess over that amount may be used, in which case the product will include a mixture of a functionalized polyether as in structure I and unreacted starting polyisocyanate.

In some embodiments, the prepolymer includes an isocyanate-terminated functionalized polyether according to structure I, which is modified to contain one or more biuret, isocyanurate, urea or allophonate groups. Among these, isocyanurate-containing species are preferred. Biuret-, urea- and/or allophonate-containing species can be formed by reaction of a functionalized prepolymer molecule according to structure 1 with water and either another prepolymer molecule or a molecule of unreacted starting polyisocyanate compound. This produces a compound having one or more biuret, urea and/or allophonate linkages and at least one (and preferably at least two) polyether chains having a molecular weight of 200 to 8000. Alternatively, biuret-, urea- and/or allophonate-containing prepolymers can be formed by first reacting the starting polyisocyanate with water to introduce the biuret, urea and/or allophonate groups, and then reacting the resultant material with the polyether monol or monoamine.

Isocyanurate-containing polyether prepolymers include those represented by structure (II):

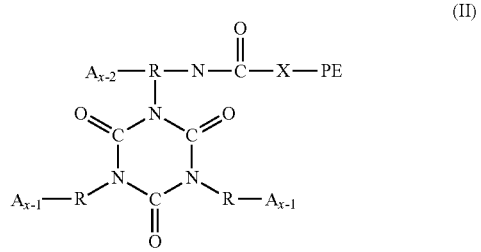

where each R, PE, X and x are as defined with respect to structure I, and each A is independently

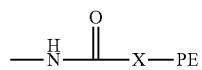

or —N═C═O. These can be prepared by trimerizing the isocyanate-terminated prepolymers of structure 1. The isocyanurate groups may be formed prior to, simultaneously with, or after the reaction of the monofunctional polyether and polyisocyanate to form the structure I functionalized polyether. This trimerization reaction is conveniently performed in the presence of an isocyanate trimerization catalyst.

The number of polyether chains in an isocyanurate-containing prepolymer as described above may be as few as one, or as many as 3(x-1) in structure I. However, it is believed in most cases that the number of polyether chains will be on average significantly less than 3(x-1). In such cases, the product obtained in the reaction will contain species according to structure I above, in which at least some of the A groups are —N═C═O.

The product of the prepolymer-forming reaction may contain various other reaction products and/or unreacted starting materials, such as, for example, some quantity of unreacted polyisocyanate compound and/or trimerized species that do not contain polyether groups, in addition to isocyanate-terminated molecules such as those having structure I above. If water is present during the trimerization reaction, biuret-, urea- and/or allophonate-containing species as described above may also form and be present in the product mixture. The relative amounts of these various species will depend primarily on the relative amounts of monofunctional polyether and polyisocyanate used, the extent to which the trimerization reaction is continued, and the presence of water, if any.

The reaction to form an isocyanurate-containing polyether prepolymer of structure II also can be performed sequentially by first reacting the polyisocyanate with the monofunctional polyether, and then performing the trimerization reaction.

The isocyanate groups of a functionalized polyether of structure I or structure II (including those modified to contain biuret, urea, allophonate and/or isocyanurate groups) can be capped with a polyol (such as an aminoalcohol) or other compound having two or more isocyanate-reactive groups. A polyol capping agent replaces the isocyanate groups with hydroxyl groups; other capping agents replace the isocyanate groups with other types of isocyanate-reactive groups. The isocyanate-reactive groups are linked to the polyether segment of the functionalized polyether through one or more urea and/or urethane groups. It may be desirable to do this, for example, to prevent the prepolymer from reacting with the base polyol, or to allow the prepolymer to be blended with the base polyol prior to forming a dispersion of the invention. A functionalized polyether of this type may have a structure according to structure III:

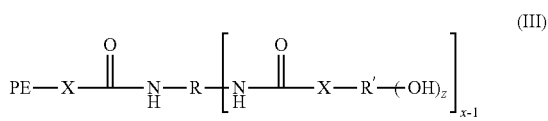

in which PE, X, and R are as defined before, z is a number from 1 to 5, preferably 1 to 2, and R' is the residue, after removal of hydroxyl and/or amino groups of a polyol or aminoalcohol. A capped isocyanurate-containing compound may have a structure according to structure IV:

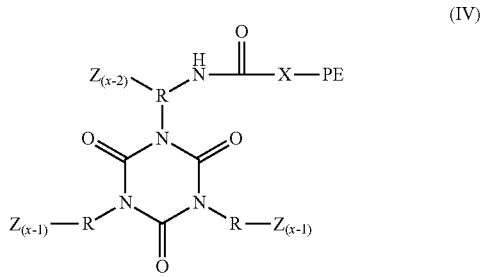

(IV)

wherein X, R, PE and x are as described before, and each Z is

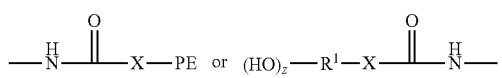

wherein $R^1$ is the residue of the polyol capping agent, z is from 1 to 5, preferably 1 or 2, and X is as defined before, and provided that at least one Z is

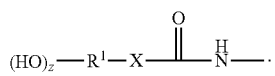

A polyol or aminoalcohol used as a capping agent to produce prepolymers having structures such as structures III or IV suitably has a hydroxyl equivalent weight of up to 399, more preferably up to 150 and especially up to 80, and suitably contains 2 to 6 hydroxyl groups and zero or one primary or secondary amino group. Examples include ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, sucrose, diethanolamine, triethanolamine, triisopropanolamine, diisopropanolamine, and the like. Aminoalcohols such as triethanolamine are preferred. Mixtures of two or more of the foregoing can be used.

In making the thixotropic polyol dispersion of the invention, the base polyol, polyisocyanate, low equivalent weight polyol, catalyst(s), prepolymer (if any) and stabilizer (if any) can be combined in any order, provided that the reaction of the low equivalent polyol with the polyisocyanate occurs in the presence of the base polyol. If the preolymer contains isocyanate groups or is added as a mixture with one or more other isocyanate-containing compounds, it may be combined with the polyisocyanate (if additional polyisocyanate is needed) and the resulting combination introduced together. If a prepolymer is provided as a mixture that contains a large amount of unreacted starting polyisocyanate, it may not be necessary to provide an additional polyisocyanate compound.

The mixture of materials is then caused to react to form polyurethane-isocyanurate particles dispersed in the base polyol. The reaction may be performed at a temperature of, for example, 0 to 100° C. Typically, the base polyol, polyisocyanate and catalyst are mixed while the components are at a temperature of 0 to 100°, preferably 10 to 70° C. and more preferably 20 to 60° C. The mixture is then allowed to react. This can be done without further applied heat if desired. The reaction of the low equivalent weight polyol and polyisocyanate is exothermic and may result in a temperature increase even if no heat is applied. Cooling can be applied if necessary to prevent excessive temperature increases due to the exothermic heat of reaction. The reaction typically requires from 30 seconds to one hour, although this depends on factors such as temperature. A more preferred time of reaction is 1 minute to 10 minutes, and in specific embodiments is 2 to 7 or 2 to 5 minutes.

Upon completion of the reaction, the crude dispersion can be stripped or otherwise treated to remove unreacted materials, volatile reaction by-products, and the like.

In certain aspects of the invention, the dispersion is prepared in the presence of 0 to 2 parts, preferably 0 to 0.5 parts, of water, based on the combined weight of the water, base polyol, low equivalent weight polyol, prepolymer (if any) and polyisocyanate compound(s).

The solids content of the dispersion may be from 1 to 50% by weight, preferably 5 to 30% by weight, more preferably 8 to 25 weight percent and especially 10 to 25 weight percent. Solids content refers to the weight of the polyurethane-isocyanurate particles as a percentage of the total weight of the dispersion. For purposes of this invention, the weight of the particles is a calculated weight, equal to the combined weight of (a) the polyisocyanates introduced into the dispersion-forming process, (b) the low equivalent weight polyol, (c) the polyisocyanates used in making the prepolymer (if any, and including any unreacted starting polyisocyanate used to make the prepolymer which remains with and is added with the prepolymer) and (d) polyurethane seed particles, if any. The weight of the polyisocyanates used in making the prepolymer is taken as the weight of the prepolymer multiplied by the weight percentage of polyisocyanate compounds used in prepolymer-forming reaction.

In some embodiments, the dispersion has a viscosity of 50 to 10000 Pa·s at 20° C. when measured at 1 rpm according to the method described in the examples. In other embodiments, the viscosity at 20° C. under a 1 rpm shear rate is 100 to 5000 Pa·s or 100 to 2500 Pa·s.

The dispersion contains hydroxyl groups. At least some of the hydroxyl groups of the base polyol remain unreacted as the dispersion is prepared. In addition, the dispersed particles also may contain free hydroxyl groups. In the latter case, the hydroxyl number of the dispersion may be higher than that of the base polyol, despite the presence of the dispersed particles.

A thixotropic dispersion of the invention is useful as a component of a curable resin composition that further includes at least one curing agent that reacts with hydroxyl groups. The presence of the dispersion imparts thixotropic properties to the curable resin composition.

The thixotropic dispersion of the invention may constitute, for example, 5 to 90, 5 to 75, 10 to 75 or 25 to 60 percent of the weight of the curable resin composition.

The curing agent may be, for example, a polyisocyanate, an epoxy resin, a dicarboxylic acid or other material having two or more functional groups that react with hydroxyl groups to cure the composition.

In addition, the curable resin composition may contain other materials as may be useful including, for example, additional polyols, crosslinkers, chain extenders, polyamines, curing catalysts, particulate fillers, reinforcing agents, colorants, rheology modifiers, preservatives, antioxidants, and the like.

The curable resin composition can be formulated as a sealant and/or adhesive, or into a coating composition such as a paint or other protective coating.

The curable resin composition can be formulated as a one-part or two-part composition. In a one-part composition, all components including the curing agent are combined. A one-part composition may be formulated for latent cure such that it cures only when exposed to certain conditions such as an elevated temperature. Latent curing characteristics can be achieved, for example, by blocking the reactive groups the curing agent; encapsulating the curing agent or catalyst; selecting a heat-activated catalyst or by other methods. The dispersion can be formed into an isocyanate-terminated prepolymer by reaction with a polyisocyanate; such an isocyanate-terminated prepolymer is useful as a moisture-curable resin component of a sealant or adhesive. A two-part composition is generally formulated into a first component that includes the dispersion of the invention and a second component that includes the curing agent(s). The two components are mixed just before application.

A dispersion of the invention also is useful in making polyurethanes by reaction with a polyisocyanate. The manufacture of polyurethanes by reaction of polyols with isocyanates is well-known. Among the types of polyurethanes that can be made in this manner include, for example, polyurethane cast elastomers, reaction injection molded elastomers, sprayed elastomers, spray foams (which can be elastomeric or rigid), slabstock flexible polyurethane foam, molded flexible polyurethane foam, semi-flexible foam, microcellular elastomers, rigid polyurethane foam (including appliance foam made in a pour-in-place application and rigid board foam), and structural polyurethanes.

The following examples are provided to illustrate the invention, but are not intended to limit the scope thereof. All parts and percentages are by weight unless otherwise indicated.

Polyol I is 2000 molecular weight all poly(propylene oxide) diol containing about 0.1% of water. It contains at least 98% secondary hydroxyl groups.

Polyol II is 1000 molecular weight all poly(propylene oxide) diol containing about 0.1% of water. It contains at least 98% secondary hydroxyl groups.

Polyol III is a 3500 molecular weight, nominally trifunctional random copolymer of propylene oxide and ethylene oxide, formed by polymerizing the monomers in the presence of a trifunctional initiator and potassium hydroxide catalyst.

Polyol IV is a nominally trifunctional poly(propylene oxide) having a hydroxyl number of 48. It is prepared using a double metal cyanide catalyst complex. At least 70% of its hydroxyl groups are secondary hydroxyls.

Polyol V is 4500 molecular weight, poly(propylene oxide) triol having 18% by weight poly(ethylene oxide) end-groups. More than 70% of its hydroxyl groups are primary hydroxyl groups. Polyol V contains about 0.1% of water.

Polyol VI is a 3000 molecular weight, nominally trifunctional poly(propylene oxide) homopolymer capped with about 8% poly(oxyethylene) groups. It contains about 0.1% of water.

Polyol VII is a 1500 molecular weight, linear monofunctional block copolymer of 90% propylene oxide and 10% ethylene oxide, containing less than 0.2% of water and about 0.2% potassium acetate. This product contains about 0.2% potassium acetate.

Polyol VIII is a 1500 molecular weight, linear monofunctional block copolymer of 90% propylene oxide and 10% ethylene oxide, containing less than 0.2% of water and free of potassium acetate.

Polyol IX is triethanolamine.

80/20 TDI is a mixture of 80% 2,4-toluene diisocyanate and 20% 2,6-diisocyanate.

Seed Dispersion A is a dispersion of 10% polyurethane particles in Polyol III. The polyurethane particles are a reaction product of Polyol IX and 80/20 TDI.

Seed Dispersion B is a dispersion of 10% polyurethane particles in Polyol V. The polyurethane particles are a reaction product of Polyol IX and 80/20 TDI.

EXAMPLES 1-4

80 parts Polyol VIII, 20 parts 80/20 TDI and 0.05 parts of a quaternary ammonium isocyanate trimerization catalyst are combined and stirred at 45° C. for several hours. The isocyanate content of the resulting prepolymer is 3.6%. 85 parts of the resulting prepolymer is then combined with 15 parts of Polyol IX and the mixture is allowed to react until the isocyanate content is reduced to less than 0.1% by weight. The resulting product is Prepolymer A.

80 parts Polyol VIII, 20 parts 80/20 TDI and 0.05 parts of a quaternary ammonium isocyanate trimerization catalyst are combined and stirred at 45° C. until the isocyanate content is reduced to about 3.2%. The resulting product is Prepolymer B.

Example 1: 89 parts of Polyol I, 1.1 parts of Prepolymer A, 0.05 parts of the quaternary ammonium trimerization catalyst and 4.45 parts of Polyol IX are mixed at room temperature for 60 seconds on a high speed laboratory mixer. 5.81 parts of 80/20 TDI are added and the resulting mixture is stirred rapidly for 5 minutes before cooling to room temperature. The product is a stable dispersion of polyurethane-isocyanurate particles in Polyol I.

Particle size is measured using a Beckman Coulter LS Particle Size Analyzer. The viscosity of the dispersion is measured using a Bohlin rheometer with cone-and-plate geometry, operated in a rotational mode at 20° C. The rheometer is operated at a speed that ramps linearly from one to 60 Hz over one minute and back to one Hz over another one minute. Viscosity measurements are made continuously and recorded. The initial, minimum and final viscosities are as reported in Table 1.

Example 2: 89 parts of Polyol II, 1.5 parts of Prepolymer A, 0.05 parts of a quaternary ammonium isocyanate trimerization catalyst, 0.1 part of a zinc carboxylate catalyst and 4.25 parts of Polyol IX are mixed at room temperature for 60 seconds on a high speed laboratory mixer. 5.72 parts of 80/20 TDI are added and the resulting mixture is stirred rapidly for 5 minutes before cooling to room temperature. The product is a stable dispersion of polyurethane-isocyanurate particles in Polyol I. In this product, isocyanurate groups are believed to form both in the preparation of Prepolymer A and when the dispersion itself is prepared. Urethane groups form during the dispersion preparation step due to the presence of the urethane catalyst. Particle size and viscosity are measured in the same manner as Example 1. Results are as reported in Table 1.

Example 3: 86 parts of Polyol III and 2 parts of a seed dispersion of polyurethane particles in Polyol III are mixed with 5.5 parts of 80/20 TDI and 2.3 parts Prepolymer B at room temperature for 60 seconds on a high speed laboratory mixer. 0.02 parts of the same isocyanate trimerization catalyst and 4.5 parts of Polyol IX are added and the resulting mixture is stirred rapidly for 10 minutes before cooling to room temperature. The product is a stable dispersion of polyurethane-isocyanurate particles in Polyol III. Isocyanurate groups form in the preparation of Prepolymer B and isocyanurate and urethane groups when the dispersion itself is prepared. Particle size and viscosity are measured as before, with results as indicated in Table 1.

Example 4 is made in the same manner as Example 3, except the amount of the isocyanate trimerization catalyst is increased to 0.2 parts, the amount of 80/20 TDI is increased to 5.52 parts and the amount of Prepolymer B is increased to 2.52 parts. Particle size and viscosity are measured as before, with results as indicated in Table 1.

TABLE 1

| Ex. No. | Viscosity, Pa · s Initial/Minimum/Final | | | Particle Size |
|---|---|---|---|---|
| 1 | 115 | 7 | 40 | Bimodal with a fraction of particles from 0.05 to 1 μm and a larger volume fraction from 1 to 25 μm. |
| 2 | 750 | 7-8 | 57 | Bimodal, with a fraction of particles from 0.05 to 0.5 μm, and a larger volume fraction from 2 to 50 μm. |
| 3 | 45 | 5 | 31 | Bimodal with a fraction of particles from 0.05 to 0.7 μm and a larger fraction from 1 to 5 μm. |
| 4 | 259 | 11 | 80 | Bimodal with a small, broad fraction of particles from 0.05 to 0.5 μm and a larger fraction from 2 to 50 μm. |

Examples 1 and 2 each show strongly thixotropic behavior. When placed under shear, the viscosity of Examples 1 and 2 become reduced to 5-10% of their initial viscosity which is measured under minimal shear. Upon removal of the shearing forces, the viscosity of each of these examples increases again. Further recovery of viscosity towards the respective initial values will occur with additional standing under no or low shear conditions. Example 2 has a lower initial viscosity than Example 1; this may be due to the formation of more urethane linkages (and therefore fewer isocyanurate groups), because of the presence of the urethane catalyst.

In these examples, the presence of isocyanurate groups is believed to contribute to the thixotropic behavior. The influence of the trimerization catalyst is seen in comparing Example 3 with Example 4. Although both are clearly thixotropic, Example 3 exhibits a smaller change in viscosity under shear than does Example 4. When Examples 3 and 4 are repeated by replacing the trimerization catalyst with the zinc carboxylate urethane catalyst, almost no shear-dependence is seen in the viscosity measurements.

EXAMPLES 5 and 6

Prepolymer C is made by combining 50 parts by weight of Polyol VII and 50 parts 80/20 TDI, and stirring the mixture at room temperature in a closed vessel for several hours. The theoretical isocyanate content (not considering biuret, urea, allophonate or isocyanurate formation) based on amounts of monol and 80/20 TDI is 23.6%. The measured isocyanate content of the product is 16%, which indicates that isocyanurate (and possibly biuret, urea and/or allophonate) formation has occurred due to the presence of potassium acetate in Polyol VII.

Prepolymer D is made by combining 25 parts of Polyol VII and 75 parts 80/20 TDI, and stirring the mixture at room temperature in a closed vessel for several hours. The theoretical isocyanate content (not considering biuret, urea, allophonate or isocyanurate formation) based on amounts of monol and 80/20 TDI is 35.5%. The measured isocyanate content of the product is 30.8%, which indicates that isocyanurate (and possibly biuret, urea and/or allophonate) formation has occurred due to the presence of potassium acetate in Polyol VII.

Example 5: 66.1 parts of Polyol III and 22.45 parts of Prepolymer C are mixed at room temperature for 60 seconds on a high speed laboratory mixer. 0.4 parts of the zinc carboxylate catalyst, 2 parts of a seed dispersion of 10% polyurethane particles in Polyol II and 9.36 parts of Polyol IX are added and the resulting mixture is stirred rapidly for 10 minutes before cooling to room temperature (to remove exothermic heat of reaction). The product is a stable dispersion of polyurethane-isocyanurate particles in Polyol III. In this case, the isocyanurate groups are formed when Prepolymer C is prepared. At least some of Prepolymer C is believed to become incorporated into the particles during the formation of the dispersion. Particle size and viscosity are measured as before. Results are as indicated in Table 2.

Example 6: 88 parts of Polyol III, 4.5 parts of Polyol IX and 0.3 parts of the zinc carboxylate catalyst are mixed at room temperature for 60 seconds on a high speed laboratory mixer. 8.65 parts of Prepolymer D are added to the polyol/catalyst mixture and the resulting mixture is stirred rapidly for 10 minutes before cooling to room temperature. The product is a stable dispersion of polyurethane-isocyanurate particles in Polyol III. Particle size and viscosity are measured as before. Results are as indicated in Table 2.

TABLE 2

| Example No. | Viscosity, Pa · s Initial/Minimum/Final (time) | | | Particle Size |
|---|---|---|---|---|
| 5 | 313 | 1 | 4 | Monomodal, with particle sizes from 0.005 to 1 μm. |
| 6 | 30 | 5 | 15 | Trimodal, with a largest volume fraction of particles from 0.05 to 0.7 μm, a smaller volume fraction at 1-8 μm and a still smaller volume fraction from 8 to 20 μm. |

EXAMPLES 7 and 8

Prepolymer E is made by combining 80 parts by weight of Polyol VIII, 0.05 parts of the isocyanate trimerization catalyst and 20 parts 80/20 TDI, and stirring the mixture at 50° C. in a closed vessel until the isocyanate content decreases to 2.4%.

Prepolymer F is made in the same manner as Prepolymer E, except the product is stirred until the isocyanate content decreases to 1.8%

Example 7: Prepolymer E is diluted with 80/20 TDI at a 25/75 weight ratio. 7.25 parts of the resulting mixture are combined with 86 parts of Polyol III and stirred for 60 seconds on a high speed laboratory mixer. 4.5 parts of Polyol IX, 2 parts of Seed Dispersion A and 0.2 parts of the zinc carboxylate catalyst are added, and the resulting reaction mixture is stirred for 10 minutes. The product is a dispersion of polyurethane-isocyanurate particles in Polyol III. Isocyanurate groups form as Prepolymer E is made and become incorporated into the particles as Prepolymer E reacts in the dispersion-forming reaction. Particle size and viscosity measurements are made as before. Results are as indicated in Table 4.

Example 8: Prepolymer F is diluted with 80/20 TDI at a 25/75 weight ratio. 7.28 parts of the resulting mixture are combined with 86 parts of Polyol III and stirred for 60 seconds on a high speed laboratory mixer. 4.5 parts of triethanolamine, 2 parts of Seed Dispersion A and 0.2 parts of the zinc carboxylate catalyst are added, and the resulting reaction mixture is stirred for 10 minutes. The product is a dispersion of polyurethane-isocyanurate particles in Polyol III. Isocyanurate groups form as Prepolymer F is made and become incorporated into the particles as Prepolymer F reacts in the dispersion-forming reaction. Particle size and viscosity measurements are made as before. Results are as indicated in Table 3.

TABLE 3

| Ex. No. | Viscosity, Pa · s Initial/Minimum/ Final | | | Particle Size |
|---|---|---|---|---|
| 7 | 62 | 6 | 35 | Bimodal with a large fraction of particles from 0.05 to 0.8 μm and a smaller fraction from 1.5 to 20 μm. |
| 8 | 27 | 3.5 | 12 | Trimodal, with a largest fraction of particles from 0.1 to 0.9 μm, and smaller fractions at 1 to 3 and 2 to 20 μm. |

Example 7 exhibits a higher initial viscosity and greater thixotropic behavior than Example 8, although the degree of isocyanate trimerization in Prepolymer F is higher than in Prepolymer E. This suggests that the presence of more reactive groups in the prepolymer more strongly favors the formation of a thixotropic product, in cases in which, as in these Examples, little or no isocyanurate formation occurs during the preparation of the dispersion itself. Without those reactive groups, the prepolymer does not become significantly incorporated into the dispersed phase particles and the particles become essentially polyurethane particles instead of polyurethane-isocyanurate particles. The relative performance of Examples 7 and 8 confirms the importance of producing disperse phase polyurethane-isocyanurate particles in making products exhibiting high thixotropy.

EXAMPLE 9

Example 9 is made by pre-reacting for 4 minutes under stirring at room temperature a blend of 79 parts Polyol III, 2 parts Polyol VIII, 0.05 parts of the quaternary ammonium isocyanate trimerization catalyst and 11.7 parts of TDI 80/20. Then, 9 parts of Polyol IX and 0.1 part of zinc carboxylate are added and the reactants are stirred for 5 minutes. Particle size and viscosity measurements are made as before. Results are reported in Table 4.

TABLE 4

| Example No. | Viscosity, Pa · s Initial/Minimum/Final | | | Particle Size |
|---|---|---|---|---|
| 9 | 32 | 26 | 32 | 0.1 to 1.5 microns |

Example 9 exhibits a high viscosity, at least in part due to the presence of the quaternary ammonium isocyanate trimerization catalyst. However, because the amount of the catalyst level is small, fewer isocyanurate groups are believed to form compared to the previous examples. As a result, Example 9 is as not as strongly thixotropic as Examples 1-9. Stronger thixotropic behavior can be achieved by increasing the catalyst level and/or the reaction time.

What is claimed is:

1. A thixotropic dispersion of polyurethane-isocyanurate particles in a liquid base polyol, wherein the polyurethane-isocyanurate particles include the reaction product of a polyol having a hydroxyl equivalent weight of up to 80 and 2 to 6 hydroxyl groups per molecule with one or more polyisocyanate compounds in the presence of an isocyanurate trimerization catalyst, and wherein the polyurethane-isocyanurate particles constitute 5 to 35 percent of the weight of the dispersion.

2. The thixotropic dispersion of claim 1, wherein the liquid base polyol has a hydroxyl equivalent weight of at least 200 and an average nominal hydroxyl functionality of at least two hydroxyl groups per molecule.

3. The thixotropic dispersion of claim 2, wherein the polyol having a hydroxyl equivalent weight of up to 80 and 2 to 6 hydroxyl groups per molecule includes an aminoalcohol.

4. The thixotropic dispersion of claim 3, wherein the polyol having a hydroxyl equivalent weight of up to 80 and 2 to 6 hydroxyl groups per molecule is triethanolamine or a mixture containing 75 to 99.9% triethanolamine.

5. The thixotropic dispersion of claim 4, wherein the polyisocyanate compounds include toluene diisocyanate or MDI.

6. A thixotropic dispersion of polyurethane-isocyanurate particles in a liquid base polyol, wherein the polyurethane-isocyanurate particles include the reaction product of a polyol having a hydroxyl equivalent weight of up to 80 and 2 to 6 hydroxyl groups per molecule with one or more polyisocyanate compounds in the presence of an isocyanurate trimerization catalyst, wherein the particles are multi-modal, having at least one fraction having sizes from 20 nm to 1 μm.

7. A thixotropic dispersion of polyurethane-isocyanurate particles in a liquid base polyol, wherein the polyurethane-isocyanurate particles include the reaction product of a polyol having a hydroxyl equivalent weight of up to 80 and 2 to 6 hydroxyl groups per molecule with one or more polyisocyanate compounds in the presence of an isocyanurate trimerization catalyst, which thixotropic dispersion has a viscosity of at least 100 Pa·s at 20° C., as measured using a Bohlin rheometer with cone-and-plate geometry, operated in a rotational mode at 20° C. at a speed of one Hz.

8. A method of making the thixotropic dispersion of claim 1, comprising reacting a polyol having an equivalent weight of up to 80 and 2 to 6 hydroxyl groups per molecule with one or more polyisocyanate compounds in the presence of an isocyanurate trimerization catalyst and a base polyether polyol having a hydroxyl equivalent weight of at least 200 to form polyurethane-isocyanurate particles dispersed in the base polyol, where the reacting step is performed in the presence of a prepolymer that contains isocyanate or isocyanate-reactive groups.

9. A method of making the thixotropic dispersion of claim 1, comprising reacting a polyol having an equivalent weight of up to 80 with one or more polyisocyanate compounds in the presence of an isocyanurate trimerization catalyst, a prepolymer that has isocyanurate groups and isocyanate or isocyanate-reactive groups and a base polyether polyol to form polyurethane-isocyanurate particles dispersed in the base polyol.

10. A curable resin composition comprising the thixotropic dispersion of claim 1 and at least one curing agent that reacts with hydroxyl groups.

11. The curable resin composition of claim 10 which is a formulated coating, formulated sealant or formulated adhesive.

12. The thixotropic dispersion of claim 6, wherein the liquid base polyol has a hydroxyl equivalent weight of at least 200 and an average nominal hydroxyl functionality of at least two hydroxyl groups per molecule.

13. The thixotropic dispersion of claim 12, wherein the polyol having a hydroxyl equivalent weight of up to 80 and 2 to 6 hydroxyl groups per molecule includes an aminoalcohol.

14. The thixotropic dispersion of claim 13, wherein the polyol having a hydroxyl equivalent weight of up to 80 and 2 to 6 hydroxyl groups per molecule is triethanolamine or a mixture containing 75 to 99.9% triethanolamine.

15. The thixotropic dispersion of claim 14, wherein the polyisocyanate compounds include toluene diisocyanate or MDI.

16. The thixotropic dispersion of claim 7, wherein the liquid base polyol has a hydroxyl equivalent weight of at least 200 and an average nominal hydroxyl functionality of at least two hydroxyl groups per molecule.

17. The thixotropic dispersion of claim 16, wherein the polyol having a hydroxyl equivalent weight of up to 80 and 2 to 6 hydroxyl groups per molecule includes an aminoalcohol.

18. The thixotropic dispersion of claim 17, wherein the polyol having a hydroxyl equivalent weight of up to 80 and 2 to 6 hydroxyl groups per molecule is triethanolamine or a mixture containing 75 to 99.9% triethanolamine.

19. The thixotropic dispersion of claim 18, wherein the polyisocyanate compounds include toluene diisocyanate or MDI.

20. A curable resin composition comprising the thixotropic dispersion of claim 6 and at least one curing agent that reacts with hydroxyl groups.

21. The curable resin composition of claim 20 which is a formulated coating, formulated sealant or formulated adhesive.

22. A curable resin composition comprising the thixotropic dispersion of claim 7 and at least one curing agent that reacts with hydroxyl groups.

23. The curable resin composition of claim 22 which is a formulated coating, formulated sealant or formulated adhesive.

\* \* \* \* \*